(12) United States Patent
Segreto

(10) Patent No.: US 6,843,205 B1
(45) Date of Patent: Jan. 18, 2005

(54) PET WATERING SYSTEM WITH RETRACTABLE BOWL

(76) Inventor: Thomas J. Segreto, 47 First Ave., Medford, NY (US) 11763

( * ) Notice: Subject to any disclaimer, the term of this patent is extended or adjusted under 35 U.S.C. 154(b) by 96 days.

(21) Appl. No.: 10/353,311

(22) Filed: Jan. 29, 2003

(51) Int. Cl.[7] .................................................. A01K 7/00
(52) U.S. Cl. ......................................... 119/74; 119/515
(58) Field of Search ............................... 119/51.5, 61.5, 119/72, 74; 206/216, 217, 546, 547; 222/130; D7/608; D30/121, 129, 130, 132

(56) References Cited

U.S. PATENT DOCUMENTS

| | | | |
|---|---|---|---|
| 2,531,262 A | * 11/1950 | Engelhaupt | 119/74 |
| 2,791,984 A | * 5/1957 | Paul | 119/51.12 |
| 3,384,259 A | * 5/1968 | Hoffstadt | 220/4.27 |
| 3,582,174 A | * 6/1971 | Riley | 312/334.28 |
| 3,985,104 A | * 10/1976 | Klemer | 119/51.12 |
| 4,315,483 A | * 2/1982 | Scheidler | 119/51.11 |
| 4,573,434 A | 3/1986 | Gardner | 119/77 |
| 4,947,796 A | * 8/1990 | Robinette | 119/51.5 |
| 5,086,926 A | * 2/1992 | Paige et al. | 206/542 |
| 5,351,649 A | * 10/1994 | Rovira Badia et al. | 119/53.5 |
| 5,488,927 A | 2/1996 | Lorenzana et al. | 119/51.5 |
| 5,738,038 A | 4/1998 | Barton | 119/73 |
| 5,809,934 A | * 9/1998 | Gavet | 119/52.1 |
| 5,884,580 A | 3/1999 | Faircloth, Jr. | 119/51.5 |
| 6,135,056 A | * 10/2000 | Kuo | 119/51.11 |

* cited by examiner

Primary Examiner—Charles T. Jordan
Assistant Examiner—Kimberly S. Smith
(74) Attorney, Agent, or Firm—Sturm & Fix LLP

(57) ABSTRACT

A watering system (10) for pets wherein, the system (10) indudes an elongated generally cylindrical housing member (20) having an upper portion ($20_A$) that defines a reservoir (21) and a lower portion ($20_B$) that includes a circular base (26) having a raised rail (28) and a semi-circular peripheral wall (27) wherein, the raised rail (28) is dimensioned to be received in an elongated channel (32) formed in the bottom (31) of a water bowl member (30) that is slidably disposed beneath the reservoir (21).

11 Claims, 1 Drawing Sheet

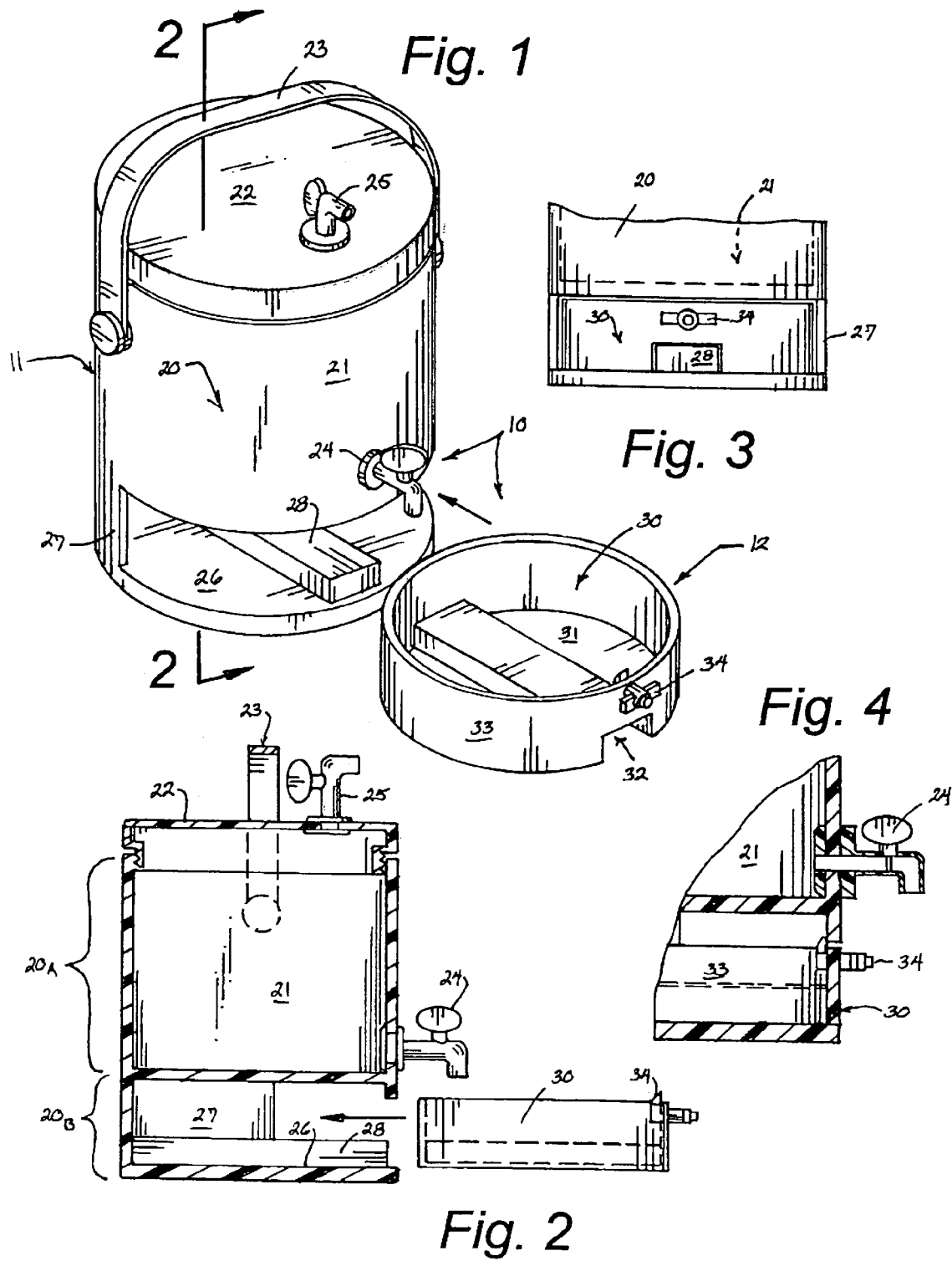

PET WATERING SYSTEM WITH RETRACTABLE BOWL

CROSS REFERENCE TO RELATED APPLICATIONS

The present invention was the subject matter of Document Disclosure Program Registration No. 513,020, filed in the United States Patent and Trademark Office on Jun. 11, 2002.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of portable pet watering systems in general and in particular to a pet watering system having a retractable water bowl.

2. Description of Related Art

As can be seen by reference to the following U.S. Pat. Nos. 5,738,038; 4,573,434; 5,488,927; and 5,884,580, the prior art is replete with myriad and diverse pet watering devices.

While all of the aforementioned prior art constructions are more than adequate for the basic purpose and function for which they have been specifically designed, they are uniformly deficient with respect to their failure to provide a simple, efficient, and practical large capacity pet watering system having a water bowl that can be retracted beneath the watering system reservoir for ease of transport.

As anyone who has had to transport one or more dogs on an extended trip is all too well aware, almost all of the commercially available transportable pet waterers have a limited water supply that requires constant replenishment over the course of a long trip.

As a consequence of the foregoing situation, there has existed a longstanding need among dog owners for a new and improved pet watering system having a retractable water bowl that can be extended from and retracted beneath a large capacity water reservoir, and the provision of such a construction is a stated objective of the present invention.

BRIEF SUMMARY OF THE INVENTION

Briefly stated, the pet watering system that forms the basis of the present invention comprises in general a reservoir unit and a bowl unit stored within, and retractable relative to, the lower portion of the reservoir unit wherein, the bowl unit provides vertical support to the upper portion of the reservoir unit.

As will be explained in greater detail further on in the specification, the reservoir unit comprises an elongated cylindrical housing member the upper portion of which defines a reservoir chamber having a spigot outlet.

In addition, the lower portion of the housing member is provided with a circular base having a semi-circular peripheral wall that forms the operative connection between the upper and lower portions of the housing member wherein, the circular base is further provided with a raised rail that extends from the midpoint of the semi-circular wall in a diametrical fashion across the base member.

Furthermore, the bowl unit includes a circular bowl member the bottom of which is provided with a raised portion that forms a transverse channel on the underside of the bowl member wherein, the transverse channel is dimensioned to be slidably received on the raised rail on top of the circular base of the housing member so that the bowl member is laterally retractable relative to the housing member and is further provided with a latching element for releasably retaining the bowl member in its stored position relative to the housing member.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is an exploded perspective view of the pet watering system that forms the basis of the present invention;

FIG. 2 is a cross-sectional view taken through line 2—2 of FIG. 1;

FIG. 3 is a front plan view of the lower portion of the watering system; and,

FIG. 4 is an isolated cross-sectional detail view of the spigot element and the latching engagement between the bowl unit and the reservoir unit.

DETAILED DESCRIPTION OF THE INVENTION

As can be seen by reference to the drawings, and in particularly to FIG. 1, the pet watering system that forms the basis of the present invention is designated generally by the reference number 10. The watering system 10 comprises in general a reservoir unit 11 and a bowl unit 12. These units will now be described in seriatim fashion.

As shown in FIGS. 1 and 2, the reservoir unit 11 comprises an elongated cylindrical housing member 20 that has an upper portion $20_A$ defining a large capacity cylindrical reservoir 21 the upper end of which is provided with a removable lid element 22, a carrying handle 23 and a first spigot outlet 24 wherein, the lid element 22 is further optionally provided with a second spigot outlet 25.

In addition, the housing member 20 has a lower portion $20_B$ which includes a circular base 26 having a semi-circular vertical peripheral wall 27 which forms the operative connection between the upper $20_A$ and lower $20_B$ housing member portions wherein, the base is further provided with a raised rail 28 that extends from the midpoint of the semi-circular peripheral wall 27 in a diametrical fashion across the top of the base 26 for reasons that will be described presently.

Still referring to FIGS. 1 and 2, it can be seen that the bowl unit 12 comprises a circular bowl member 30 the diameter of which is smaller than the diameter of the circular base 26 of the housing member 20 such that the bowl member 30 may fit beneath the reservoir 21 in its stored position.

Turning now to FIGS. 1 and 3, it can be seen that the underside of the bottom 31 of the bowl member 30 is provided with a transverse channel 32 wherein, the channel 32 is dimensioned to slidably receive the raised rail 28 on the base 26 of the housing member 20 so that the bowl member 30 can be extended and retracted in a lateral fashion relative to the housing member 20.

As can also be seen by reference to FIGS. 1 through 4, the bowl member 30 is further provided with a latching element 34 on the raised sidewall 33 of the bowl member 30 wherein, the latching element 34 is rotated into, and into and out of, engagement with a cooperating portion of the housing member 20 while serving the dual function of providing a "finger pull" for extracting the bowl member 30 from its stored position beneath the reservoir 21.

As can also be seen by reference to FIGS. 1 and 4, the spigot 24 and the raised rail 28 are vertically aligned with one another, as are the latch element 34 and the channel 32. Furthermore, the bowl member 30 will always have a portion of its sidewall 33 disposed in a potentially supporting position relative to the unsupported portion of the cylindrical reservoir 21 which may have a tendency to droop slightly particularly when the reservoir is completely full.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

What is claimed is:

1. A watering system for pets wherein, the system comprises:

a reservoir unit including an elongated generally cylindrical housing member having an upper portion defining a large capacity reservoir provided with a first spigot outlet and removable lid element and a lower portion including a circular base having a raised semi-circular peripheral wall that supports said reservoir; and, a bowl unit including a circular bowl member having a diameter smaller than the diameter of the circular base of the housing member and dimensioned to be slidably received between the bottom of the reservoir and the top of the circular base, along a horizontal axis positioned beneath said first spigot outlet.

2. The system as in claim 1; wherein, the lid element is provided with a second spigot outlet.

3. The system as in claim 1; wherein, the base is provided with a raised rail and the bottom of the bowl member is provided with a channel dimensioned to slidably engage said rail.

4. The system as in claim 1; wherein, the bowl member is further provided with means for captively yet releasably engaging the bowl member beneath the reservoir.

5. The system as in claim 3; wherein, the housing member is provided with a handle element and a first spigot outlet.

6. The system as in claim 5; wherein, the lid element is provided with a second spigot outlet.

7. The system as in claim 3; wherein, the raised rail intersects the semi-circular peripheral wall proximate the mid-point of the peripheral wall.

8. The system as in claim 3; wherein, the bowl member is further provided with means for captively yet releasably engaging the bowl member beneath the reservoir.

9. The system as in claim 8; wherein, the first spigot outlet and the raised rail are vertically aligned.

10. The system as in claim 9; wherein, the bowl member is further provided with a releasable catch element that releasably engages a selected portion of the housing.

11. The system as in claim 10; wherein, the catch element is vertically aligned with the channel in the bowl member.

* * * * *